United States Patent [19]

Milani et al.

[11] Patent Number: 5,684,860
[45] Date of Patent: Nov. 4, 1997

[54] APPARATUS FOR AUTOMATICALLY DISTRIBUTING CALLS BETWEEN USERS AND A FLEET OF MOBILE STATIONS THROUGH A CENTRAL STATION

[76] Inventors: Carlo Milani, Via Case Nouve, 30, Vistarino (Pavia); Gianantonio Moretto, Via Rugabella, 9, Novedrate (Como), both of Italy

[21] Appl. No.: 448,471
[22] PCT Filed: Dec. 15, 1993
[86] PCT No.: PCT/IT93/00130
    § 371 Date: Jun. 2, 1995
    § 102(e) Date: Jun. 2, 1995
[87] PCT Pub. No.: WO94/14291
    PCT Pub. Date: Jun. 23, 1994

[30]    Foreign Application Priority Data

Dec. 15, 1992 [IT] Italy .................... PV92A0016

[51] Int. Cl.⁶ .................. H04M 11/00; H04J 3/16; H04B 1/00; H04Q 7/00
[52] U.S. Cl. .................. 379/59; 379/49; 379/63; 370/312; 370/390; 455/54.2; 455/56.1
[58] Field of Search .................. 379/59, 60, 63, 379/49; 370/95.3, 312, 390; 455/53.1, 54.1, 54.2, 56.1

[56]    References Cited

U.S. PATENT DOCUMENTS

| 4,737,977 | 4/1988 | Norman | 455/54.1 X |
|---|---|---|---|
| 4,972,439 | 11/1990 | Kuznicki et al. | 379/63 X |
| 5,043,736 | 8/1991 | Darnell et al. | 342/357 |
| 5,046,082 | 9/1991 | Zicker et al. | 379/59 |
| 5,121,391 | 6/1992 | Paneth et al. | 379/59 X |
| 5,235,633 | 8/1993 | Dennison et al. | 379/60 |
| 5,299,198 | 3/1994 | Kay et al. | 370/95.3 |
| 5,365,516 | 11/1994 | Jandrell | 370/18 |
| 5,475,689 | 12/1995 | Kay et al. | 379/59 X |

FOREIGN PATENT DOCUMENTS

| 0235498 | 9/1987 | European Pat. Off. |
|---|---|---|
| 3151754 | 6/1991 | Japan . |
| 4229397 | 8/1992 | Japan . |

OTHER PUBLICATIONS

"A Taxi Communication System"; Proceedings of the 29th Vehicular Technology Conference (27 Mar. 1979); pp. 307–308.

"Computer–Aided New Dispatch System For The Tokyo Metropolitan Police Department"; Proceedings of the 1980 Carnahan Conference on Crime Countermeasures (14 May 1980); pp. 39–45.

Primary Examiner—Dwayne Bost
Assistant Examiner—Scott Richardson
Attorney, Agent, or Firm—Panitch Schwarze Jacobs & Nadel, P.C.

[57]    ABSTRACT

Apparatus for automatically distributing communications between users and a fleet of mobile stations through a central station including a telephone exchange (1), a plurality of telephone answering modules (3) provided with a phone numbers data-bank and connected between said exchange (1) and a LAN net (4), and a pair of central processing modules (5, 5') connected to said LAN net (4) and to a plurality of radio transmission interface modules (6), each of these controlling a receiving radio (7) and a transmitting radio (8). Each mobile station includes a radio transceiver provided with a keyboard and a display, a localizing device, and a local processing module controlling the operation of the mobile station and containing a clock provided with a clock time controller.

11 Claims, 2 Drawing Sheets

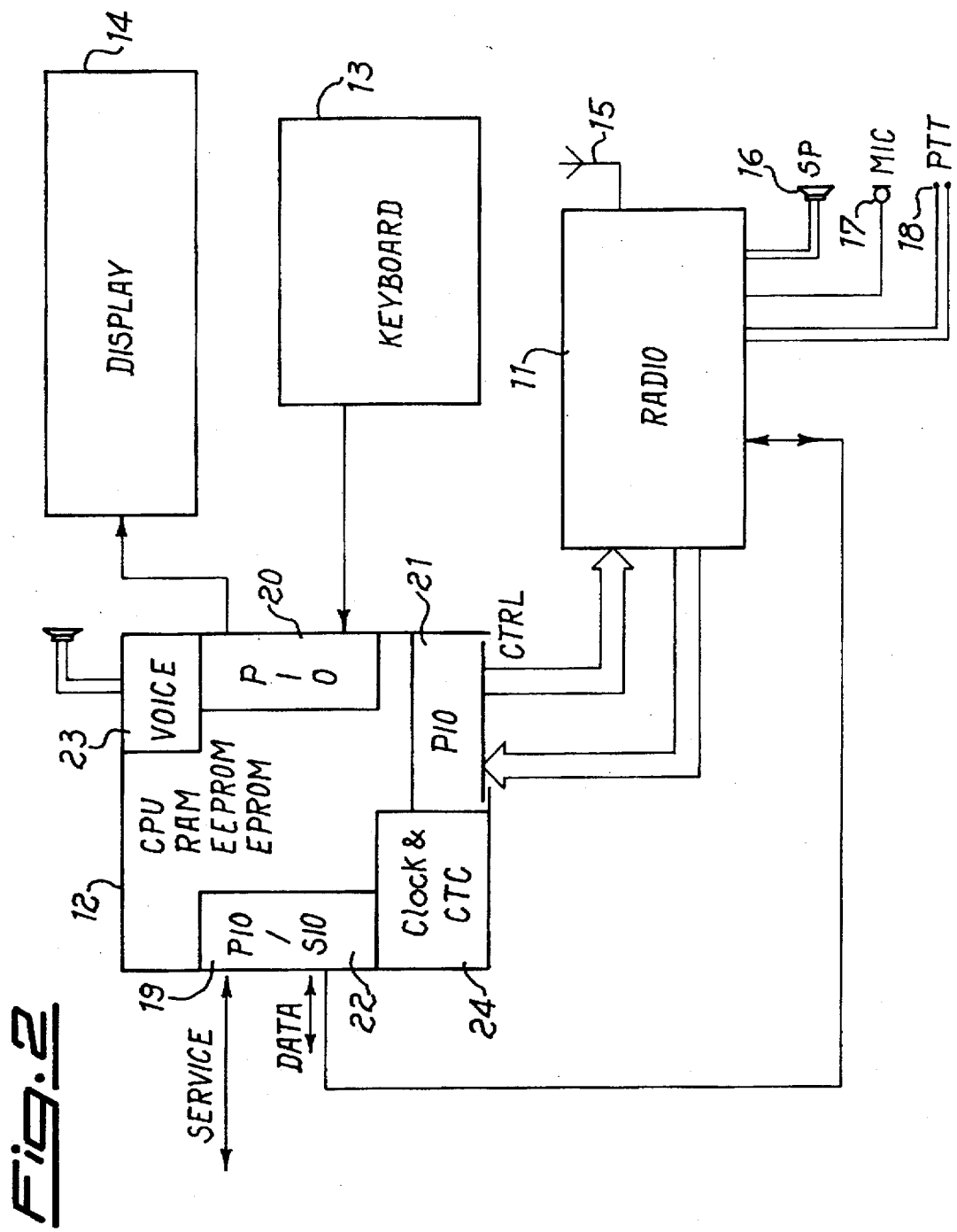

APPARATUS FOR AUTOMATICALLY DISTRIBUTING CALLS BETWEEN USERS AND A FLEET OF MOBILE STATIONS THROUGH A CENTRAL STATION

The present invention concerns an apparatus for automatically handling and distributing service requests, by means of data and voice communications, between a plurality of users and a fleet composed by a plurality of mobile stations through a central sorting station. Reference will be made hereafter to the application of the present apparatus to the handling of taxi calls. It is apparent that the same apparatus may be used, with small changes, for similar applications such as the handling of ambulance calls, home collection/delivery calls and the like.

As it is known, there are essentially three ways to ask for a taxi run:

a) the user catches the taxi directly on the road b) the user makes a phone call to a taxi parking c) the user makes a phone call to a radio-taxi central station.

The most efficient way is the radio-taxi service, consisting in a central station which receives the phone calls from the users and contacts, by radio, a fleet of taxis each one provided with a radio transceiver device. The taxi drivers interested in taking the call communicate to the central station their estimated time of arrival to the requested address. The central station operator chooses the nearest one he was able to hear and communicates to the user his name and estimated time of arrival.

This way of operation has various drawbacks of different nature. From an economical point of view, it requires several operators usually working 24 hours a day in two- or three-hour shifts, therefore implying a quite high personnel cost. Moreover, from a safety point of view, the drivers are continuously distracted by the calls from the central station, with the possible dangerous consequences deriving therefrom.

As to the efficiency of the procedure, the driver proposing himself for the call presumes to be the nearest to the user, but this is not always true since each driver does not know the positions of the other taxis. Furthermore, possible misunderstandings about the address may occur between the user and the operator of the central station, or between the operator and the drivers listening to the call. Also, this procedure does not assure a correct distribution of the calls among the taxis, since a driver may intentionally "cheat" on his position to take more calls than his colleagues, or he may illegally increase the power output of his radio so as to overcome the transmissions of the other drivers.

Examples are already known of an apparatus for automatically handling and distributing service requests, by means of data and voice communications, between a plurality of users and a fleet composed by a plurality of mobile stations through a central sorting station, said examples being given in EP-A-0.235.498 and JP-A-3.151.754. This type of apparatus preferably includes a mobile station position monitoring system like the one disclosed in JP-A-4.229.397.

Nonetheless, the greatest obstacle to the wide diffusion of such an apparatus is the limited number of mobile stations which can be managed by each radio channel, i.e. the great number of channels required for a large fleet. The efficiency of the apparatus, and therefore its usefulness, mainly rest on the efficient exploitation of the available radio frequencies, but this problem has not been dealt with in the above-mentioned prior art documents.

Therefore, the object of the present invention is to provide an apparatus for automatically handling and distributing the calls which is capable of overcoming the above-mentioned drawbacks.

This object is achieved by means of an apparatus according to claim 1.

A first apparent advantage of the apparatus according to the present invention is the great reduction in the cost of each mobile station not requiring a very stable, expensive and sophisticated high-precision clock.

A second advantage of the present apparatus is the great increase in efficiency stemming from a much more efficient use of the radio channels achieved by frequently synchronizing the mobile stations with the central station by means of a signal continuously broadcast by the central station.

Another advantage of this apparatus is that the central station usually communicates only with a single mobile station at a time, so that the other drivers are not disturbed by messages not directed to them.

These and other advantages and characteristics of the apparatus according to the present invention will be apparent from the following detailed description of a preferred embodiment thereof, intended as a non-limiting example, referring to the annexed drawings wherein:

FIG. 2 is a diagrammatic view showing the structure of one of the mobile stations.

Figure 1:
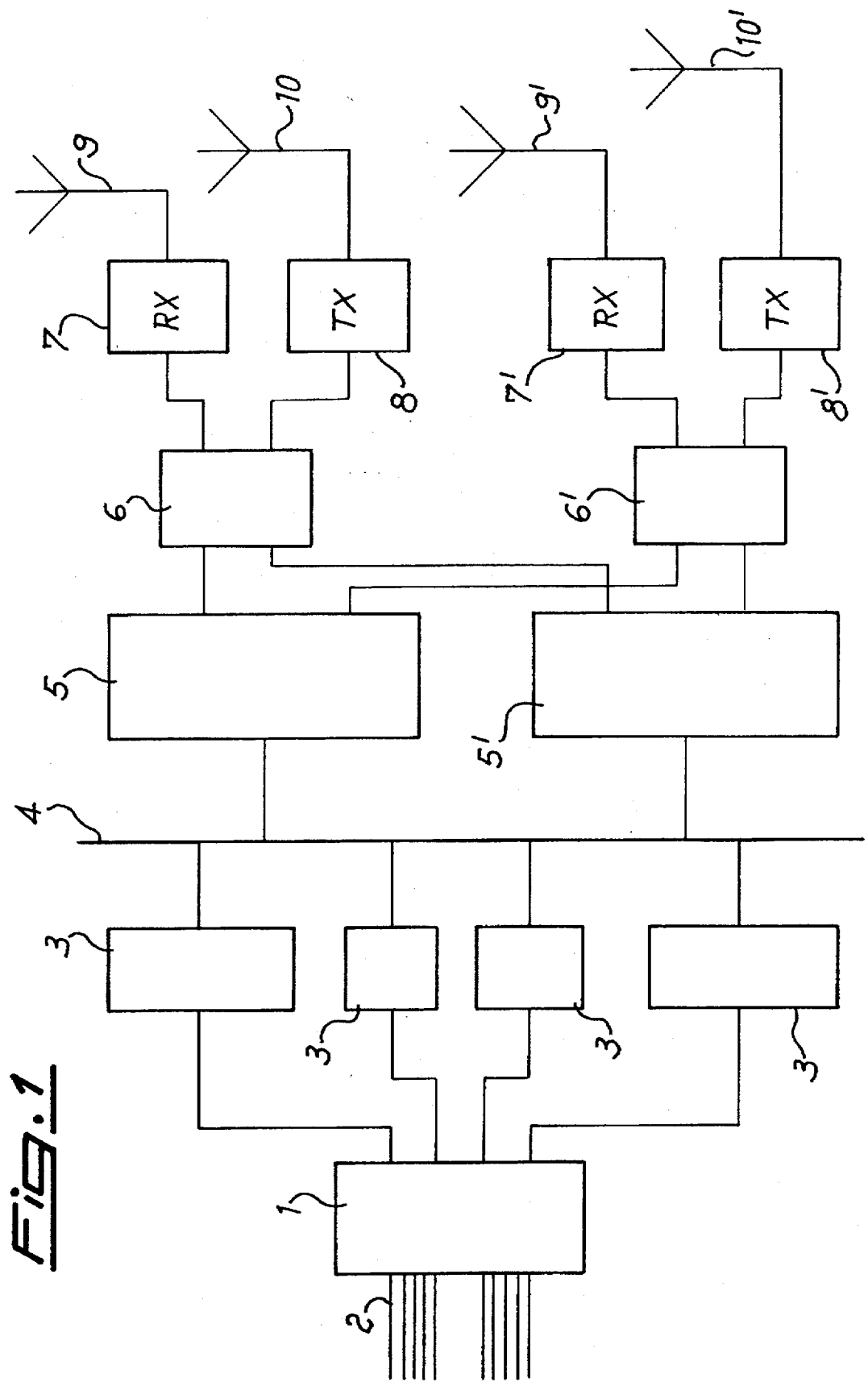
FIG. 1 is a diagrammatic view showing the structure of the central station.

Referring to FIG. 1, there is seen that the central station of the apparatus according to the present invention includes a telephone exchange 1 connected on one side to the telephone lines 2 and on the other side to a plurality (four shown in FIG. 1) of telephone answering modules 3 (TAM) which are connected, in turn, to a LAN net 4. Connected to this LAN net 4 are a pair of central processing modules 5, 5' (CPM), each one being connected with the other one and with a plurality (two shown in FIG. 1) of radio transmission interface modules 6, 6', etc. (RTIM), which will be explained in greater detail later on. Each RTIM 6, 6', etc. handles a radio channel through a receiving radio 7, 7', etc. and a transmitting radio 8, 8', etc. provided with the relevant antennas 9, 9', etc. and 10, 10', etc., respectively.

As shown in FIG. 2, each mobile station installed on a taxi essentially includes a radio transceiver 11, a local processing module 12 (LPM) and a control panel formed by a keyboard 13 and a display 14. The radio 11 is provided with standard elements such as an antenna 15, a speaker 16, a microphone 17 and a push-to-talk (PTT) microphone 18. Similarly, keyboard 13 is provided with a plurality of keys (from 16 to 102) and LED lights (e.g. 8 LEDs); also, display 14 is any known type of display, preferably a 32- or 64-character back-light LCD display.

The LPM 12 is provided with a plurality of parallel input/output (PIO) ports and serial input/output (SIO) ports for its connection to the other elements of the mobile station. A first group of PIO ports 19 connects LPM 12 to several service devices (not shown) which include a Global Positioning System (GPS) receiver used to obtain the exact position of the mobile station, the taximeter and other optional accessories such as a credit card reader, a printer, an alarm detector, etc. A second group of PIO ports 20 connects LPM 12 to keyboard 13 and display 14, while a third group of PIO ports 21 acts as an interface with radio 11 same as RTIMs 6, 6' of the central station. A group of SIO ports 22 is used to transmit from LPM 12 to radio 11 the data concerning the operating frequency of the latter.

The LPM 12 further includes a CPU of suitable power (e.g. Intel 80286), a RAM (preferably 128K expandible to 512K), an erasable programmable ROM (EPROM) wherein the control software is stored, and an electrically erasable programmable ROM (EEPROM) wherein the configuration parameters are stored. Finally, LPM 12 includes a voice synthesizer 23 and a clock 24 provided with a clock time controller (CTC) which sets the clock time according to an incoming control as it will be explained later on.

It is clear that all the above-mentioned elements are selected and installed in view of the specific operating conditions of the mobile station in terms of vibrations, temperature range, etc. In particular, LPM 12 may be installed under the dash panel, in the trunk or in any other proper position on the taxi, whereas the radio and the control panel must obviously be within reach of the driver.

The apparatus according to the present invention operates in the following way. The user requiring a taxi makes a phone call to the central station where the telephone exchange 1 puts him in contact with a TAM 3 which automatically answers with a synthesized or pre-recorded voice. Following the vocal instructions given by TAM 3, the user communicates the type of service required (taxi run, special services, operator if present, etc.) through a numerical code given by means of the telephone keyboard. The user is automatically localized by TAM 3 through the phone number, thanks to a data-bank containing the positions of all the telephones of the town and hinterland, or even of the whole region. Once the user has communicated the service requested and his position has been determined, TAM 3 passes over the data of the call to CPM 5 through LAN net 4, and holds the line with music and/or messages.

When CPM 5 receives the request from TAM 3, it selects automatically a first free taxi according to a predetermined selection method which takes into consideration various parameters such as the distance from the user, the time passed since the last run, etc., all of these data being recorded in the files of CPM 5. In particular, the position of the taxi is known as a signal is periodically received from the mobile station on the taxi which includes, as mentioned above, a GPS receiver which can determine the taxi's position with an error as small as 50–100 m, or even less according to the position. Obviously, other localizing devices may be used capable of determining the taxi's position with sufficient accuracy.

After selecting the first free taxi, CPM 5 transmits the data of the request to said taxi converting such data into a radio transmission by means of a RTIM 6 which broadcasts the call through antenna 10 of its transmitting radio 8. The RTIM 6 essentially consists of a processor capable of receiving logical data from CPM 5 and converting them, by means of proper hardware, into modulated frequency pulses to be transmitted by radio, and vice versa converting a received radio transmission into logical data.

The messagge broadcast from the central station includes a message header containing the mobile station identification field, i.e. a destination address, so that only the selected mobile station acknowledges it, while the other taxi drivers are not disturbed by a message not directed to them. The selected mobile station which receives said radio transmission on radio 11 converts it back into logical data by means of PIO ports 21, as mentioned above. The incoming message is communicated to the taxi driver by means of display 14 and/or voice synthesizer 23, and the driver communicates his acceptance or refusal of the call by means of keyboard 13, possibly together with his estimated time of arrival to the user. The driver's answer is transmitted back to the central station, also with a message header as above, and received by RTIM 6 through antenna 9 of the receiving radio 7. In case of refusal of the call by the driver, CPM 5 selects a second free taxi and the above procedure is repeated. In case of acceptance of the call, TAM 3 communicates to the user the identification of the taxi answering his call and puts in contact the user with the driver so that the former can give his final indications to be picked up by the latter.

From the description above, it is apparent that the human operators of the central station are effectively replaced by a plurality of TAMs connected to a CPM which simultaneously keeps track of the position of the entire taxi fleet, knows which taxis are free and on duty and which taxi deserves the priority in a certain area. Moreover the CPM can memorize the whole activity of the fleet (duration of runs, number of calls, data and voice transmissions, etc.) and is capable of optimizing the exploitment of the available radio channels by a proper allocation of said channels to the different mobile stations. To this purpose, the radio of each mobile station can be tuned on a different frequency, as mentioned above, according to the indications coming from the central station and passed from LPM 12 to radio 11 through SIO ports 22.

Another important feature of the mobile station, intended to increase the channel efficiency by reducing the risk of collisions between the messages, is the presence of clock 24 provided with a CTC. Instead of using expensive high stability local clocks for each mobile station, the central station continuously transmits constant length messages with the purpose of centralized synchronization of clock 24 of each mobile station by means of the CTC. In this way, the transmission time is slotted so that the mobile stations send messages only at the beginning of each time slot, and clock 24 may be less precise and less expensive since it is frequently re-synchronized.

It should be noted that the central station includes a pair of CPMs 5, 5' for redundancy purpose, so that in case of failure of one of them the other one takes over the operation without interruption. For the same reason the two CPMs are connected together so as to perform a continuous mutual check. As mentioned above, each CPM is connected with all the RTIMs, whose number depends on the size of the fleet to be handled; indicatively, each RTIM can handle about 300 mobile stations. Similarly, the number of TAMs depends on the number of telephone lines arriving to the central station.

It is obvious that other optional services may be added to the present apparatus, such as data-bank interrogations on hotels, shops, flights, etc. from the mobile stations, or automatic alarm signals in case of incident, robbery, etc. in order to take advantage of the connection with the central station and/or of the continuous tracking by means of the GPS system.

We claim:

1. An apparatus for automatically distributing a plurality of incoming telephone dispatch requests on a plurality of telephone lines to a plurality of mobile stations, each request being made by a requestor at a requestor location, the apparatus comprising:
 a central station having:
  a telephone exchange (1) connected to the telephone lines;
  a plurality of telephone answering modules (3) connected to the telephone exchange, each telephone answering module for receiving one of the incoming telephone dispatch requests by way of the telephone exchange, for determining the requestor location associated with the received request, and for producing a processed request based on the received incoming dispatch request and the origin thereof;

a central processing module (5) connected to each telephone answering module by way of a LAN net (4), the central processing module for receiving each processed request from each telephone answering module, for determining a location and an availability of each of a plurality of the mobile stations, and for assigning each processed request to one of the mobile stations based on the location and the availability of the mobile station; and a plurality of radio transmission interface modules (6) connected to the central processing module, each radio transmission interface module controlling a receiving radio (7) and a transmitting radio (8), each radio transmission interface module for communicating request data based on a particular processed request from the central processing module to a mobile station assigned to the particular processed request by way of the transmitting radio;

each mobile station having:

a radio transceiver;

a location detecting device for detecting a location of the mobile station;

a local processing module (12) connected to the location detecting device for receiving the location of the mobile station, the local processing module also being connected to the radio transceiver for transmitting the location to the central processing module by way of the radio transceiver and by way of the receiving radio of a radio transmission interface module, the local processing module also for receiving request data from the central processing module by way of the radio transceiver and by way of the transmitting radio of a requesting radio transmission interface module and for converting the received request data to display data corresponding to a particular processed request;

a display (14) connected to the local processing module for receiving the display data from the local processing module and for displaying the display data to a mobile station attendant;

a keyboard (13) connected to the local processing module for allowing the mobile station attendant to input an acceptance of the particular processed request associated with the received request data and for communicating the acceptance to the local processing module, the local processing module transmitting the acceptance to the central processing module by way of the radio transceiver and by way of the receiving radio of the requesting radio transmission interface module, the acceptance being forwarded by the central processing module to a requesting telephone answering module associated with the received request data and the requesting telephone answering module informing the requestor of the acceptance;

the local processing module including a clock (24) with a clock time controller for setting the clock according to a continuous signal broadcast by the central station and received by the local processing module by way of the radio transceiver, the local processing module being connected to the radio transceiver for controlling time-division allocations of frequencies of the radio transceiver according to the clock and according to instructions received from the central station by way of the continuous signal.

2. Apparatus according to claim 1, characterized in that it includes a second redundant central processing module (5') connected to the first central processing module (5), to the LAN net (4) and to the plurality of radio transmission interface modules (6).

3. Apparatus according to claim 1 characterized in that the local processing module (12) of each mobile station includes a CPU, a RAM, an EPROM and an EEPROM.

4. Apparatus according to claim 1, characterized in that the display (14) of each mobile station is a back-light LCD display.

5. Apparatus according to claim 1, characterized in that the location detecting device of each mobile station is a Global Positioning System receiver.

6. Apparatus according to claim 2, characterized in that the local processing module (12) of each mobile station includes a CPU, a RAM, an EPROM and an EEPROM.

7. Apparatus according to claim 2, characterized in that the display (14) of each mobile station is a back-light LCD display.

8. Apparatus according to claim 3, characterized in that the display (14) of each mobile station is a back-light LCD display.

9. Apparatus according to claim 2, characterized in that the location detecting device of each mobile station is a Global Positioning System receiver.

10. Apparatus according to claim 3, characterized in that the location detecting device of each mobile station is a Global Positioning System receiver.

11. Apparatus according to claim 4, characterized in that the location detecting device of each mobile station is a Global Positioning System receiver.

* * * * *